(12) United States Patent
Miura et al.

(10) Patent No.: US 11,294,078 B2
(45) Date of Patent: Apr. 5, 2022

(54) RADIATION IMAGING APPARATUS AND RADIATION IMAGING SYSTEM

(71) Applicant: CANON KABUSHIKI KAISHA, Tokyo (JP)

(72) Inventors: Ryosuke Miura, Ichikawa (JP); Minoru Watanabe, Yokohama (JP); Kentaro Fujiyoshi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/989,118

(22) Filed: Aug. 10, 2020

(65) Prior Publication Data

US 2020/0371259 A1 Nov. 26, 2020

Related U.S. Application Data

(63) Continuation of application No. PCT/JP2019/008776, filed on Mar. 6, 2019.

(30) Foreign Application Priority Data

Mar. 19, 2018 (JP) .............................. JP2018-051518
Feb. 5, 2019 (JP) .............................. JP2019-019071

(51) Int. Cl.
*G01T 1/24* (2006.01)
*H04N 5/32* (2006.01)
(Continued)

(52) U.S. Cl.
CPC ...... *G01T 1/20184* (2020.05); *G01T 1/20181* (2020.05); *H04N 5/32* (2013.01); *H04N 5/361* (2013.01); *H04N 5/3742* (2013.01)

(58) Field of Classification Search
CPC ... G01T 1/20181; G01T 1/20184; H04N 5/32; H04N 5/361; H04N 5/3742
See application file for complete search history.

(56) References Cited

U.S. PATENT DOCUMENTS 9,661,240 B2  5/2017 Fujiyoshi et al.
9,923,012 B2  3/2018 Sato et al.
(Continued)

FOREIGN PATENT DOCUMENTS

JP    S62-185471    8/1987
JP    2015-213221   11/2015
(Continued)

*Primary Examiner* — Mark R Gaworecki
(74) *Attorney, Agent, or Firm* — Venable LLP

(57) ABSTRACT

A radiation imaging apparatus comprises at least one first detection element including a first conversion element configured to convert radiation into an electrical signal and a first switch configured to connect an output from the first conversion element to a first signal line, at least one second detection element including a second conversion element configured to convert radiation into an electrical signal and a second switch configured to connect an output from the second conversion element to a second signal line, a readout unit configured to read out signals appearing on the first signal line and the second signal line, and a signal processing circuit configured to process a signal read out from the readout unit. A sensitivity of the first conversion element for the radiation is set to be different from a sensitivity of the second conversion element for the radiation.

16 Claims, 16 Drawing Sheets

(51) Int. Cl.
*H04N 5/361* (2011.01)
*H04N 5/374* (2011.01)
*G01T 1/20* (2006.01)

(56) References Cited

U.S. PATENT DOCUMENTS 10,537,295 B2 1/2020 Watanabe et al.
2015/0316664 A1* 11/2015 Fujiyoshi ............... G01N 23/04
378/62

FOREIGN PATENT DOCUMENTS

JP 2016-082255 5/2016
JP 2016-220116 12/2016

* cited by examiner

RADIATION IMAGING APPARATUS AND RADIATION IMAGING SYSTEM

CROSS-REFERENCE TO RELATED APPLICATIONS

This application is a Continuation of International Patent Application No. PCT/JP2019/008776, filed Mar. 6, 2019, which claims the benefit of Japanese Patent Application No. 2018-051518, filed Mar. 19, 2018, and Japanese patent Application No. 2019-019071, filed Feb. 5, 2019, all of which are hereby incorporated by reference herein in their entirety.

BACKGROUND OF THE INVENTION

Field of the Invention

The present invention relates to a radiation imaging apparatus and a radiation imaging system.

Background Art

There is available a radiation imaging apparatus in which pixels each obtained by combining a conversion element configured to convert radiation into charges and a switching element such as a thin film transistor (TFT) are arranged in a two-dimensional array. It is considered that a function of detecting irradiation information is incorporated into this radiation imaging apparatus. For example, this function is a function of detecting the start of radiation irradiation, the dose, and the integrated irradiation dose. This function allows automatic exposure control (AEC) for monitoring the integrated irradiation dose and causing the detection apparatus to control a radiation source and stop the irradiation when the integrated irradiation dose reaches an optimal value.

A signal line for reading out a signal from a detection element for detecting the start of the radiation irradiation and measuring the dose and the integrated irradiation dose is also arranged near a radiation imaging image acquisition pixel. For this reason, a nonnegligible capacitance is formed between the signal line and the imaging pixel acquisition pixel. Even if only information from the radiation detection element is to be grasped, the signal from the pixel is transmitted by this capacitance to the signal line via the capacitance (crosstalk), and it is difficult to accurately measure the radiation dose. In addition, when a thin film transistor and a photoelectric conversion element are used for the radiation detection element, characteristics such as a leakage current and a dark current change upon the change in temperature. In addition, when the temperature changes, an offset level characteristic and the like change upon driving the thin film transistor and the photoelectric conversion element.

PTL 1 discloses a technique for reducing an influence of crosstalk based on a difference between a detection element signal appearing in a first period when a switch is not rendered conductive and a detection element signal appearing in a second period when the switch is rendered conductive.

However, for example, when radiation irradiation is started, the intensity of radiation and the characteristics of offset components such as the leakage current and the dark current may often change. In this case, between the first and second periods, the crosstalk component and the offset component included in the signal of the first period and the crosstalk component and the offset component included in the signal of the second period have a difference. It is found that the reduction of the influence of the crosstalk and offset components is insufficient by calculating only the difference as described in PTL 1.

CITATION LIST

Patent Literature

PTL 1: Japanese Patent Laid-Open No. 2015-213221

SUMMARY OF THE INVENTION

In consideration of the above problem, according to the present invention, there is provided a radiation imaging apparatus including at least one first detection element including a first conversion element configured to convert radiation into an electrical signal and a first switch configured to connect an output from the first conversion element to a first signal line, at least one second detection element including a second conversion element configured to convert radiation into an electrical signal and a second switch configured to connect an output from the second conversion element to a second signal line, a readout unit configured to read out signals appearing on the first signal line and the second signal line, a reset unit configured to reset potentials of the first signal line and the second signal line, and a signal processing circuit configured to process a signal read out from the readout unit, wherein a sensitivity of the first conversion element for the radiation is set to be different from a sensitivity of the second conversion element for the radiation, a period for causing the readout unit to read out the signals from the first signal line and the second signal line includes a first period including an operation for resetting voltages of the first signal line and the second signal line by the reset unit and a subsequent operation for reading out the signals appearing on the first signal line and the second signal line in a state in which the first switch and the second switch are not rendered conductive, and a second period including an operation for resetting the voltages of the first signal line and the second signal line by the reset unit and a subsequent operation for reading out the signals appearing on the first signal line and the second signal line after the first switch and the second switch are rendered conductive, and the signal processing circuit corrects the signal read out from the first signal line in the second period based on the signals read out from the second signal line in the first period and the second period.

Further features of the present invention will become apparent from the following description of exemplary embodiments with reference to the attached drawings.

DESCRIPTION OF THE EMBODIMENTS

Figure 1:
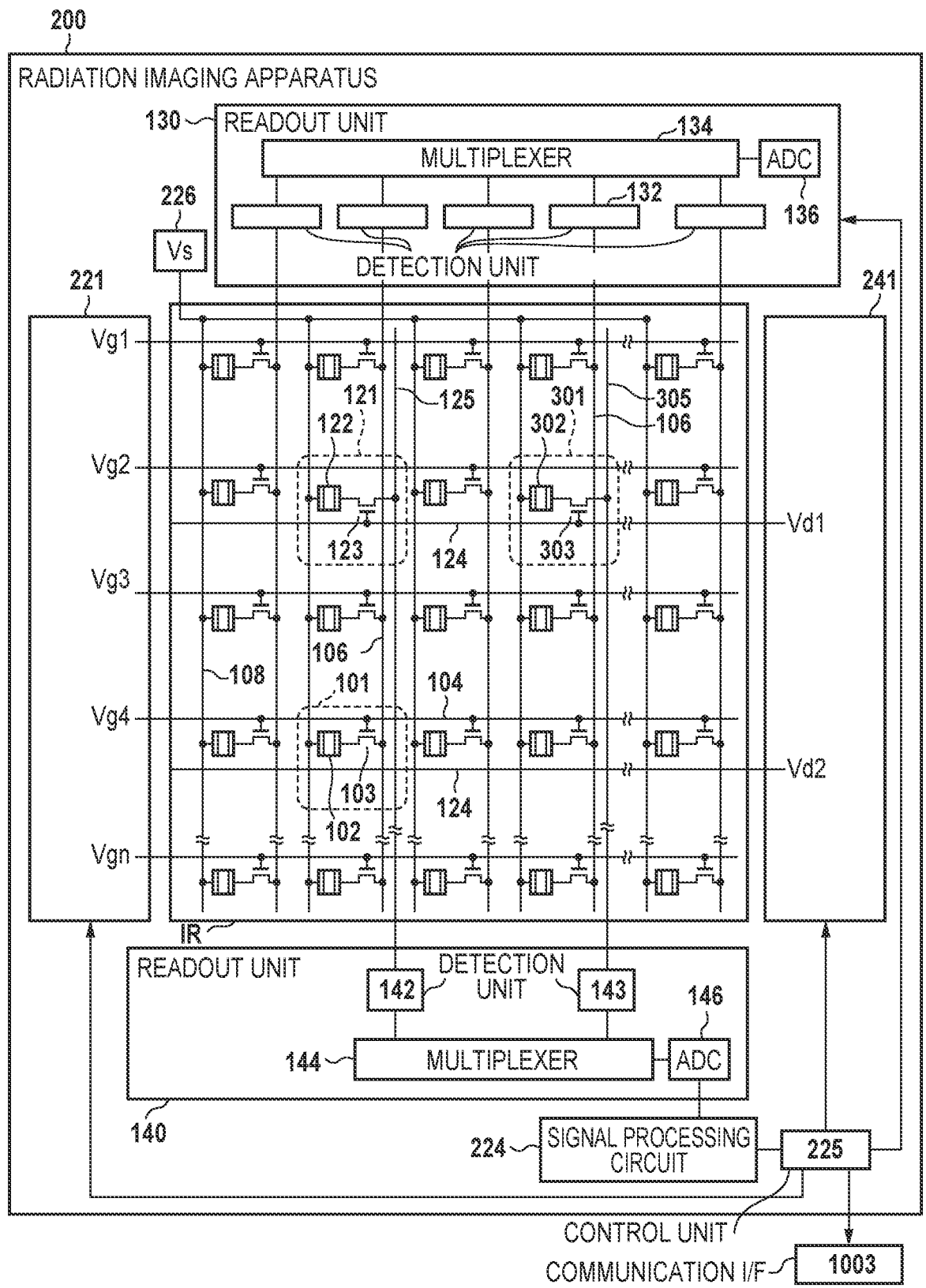
FIG. 1 is a view showing an arrangement of a radiation imaging apparatus according to the first embodiment of the present invention.

Specific embodiments of a radiation imaging apparatus according to the present invention will be described below with reference to the accompanying drawings. Note that in the following explanation and drawings, common reference numerals are used throughout a plurality of drawings. The plurality of drawings are referred to explain the common arrangement, and an explanation thereof will be appropriately omitted. Note that radiation according to the present invention can include not only α-rays, β-rays, and γ-rays that are beams generated by particles (including photons) emitted by radioactive decay but also beams having energy equal to or more than the energy of these beams, for example, X-rays, particle rays, and cosmic rays.

First Embodiment

FIG. 1 shows the arrangement of a radiation imaging apparatus 200. The radiation imaging apparatus 200 includes a plurality of pixels arrayed in an imaging region IR forming a plurality of rows and a plurality of columns. A plurality of imaging pixels 101 configured to acquire a radiation image, a first detection element 121 configured to generate radiation irradiation information, and a second detection element 301 configured to correct the radiation irradiation information are arranged in the imaging region IR. Each imaging pixel 101 includes an imaging element 102 configured to convert radiation into an electrical signal, and a connection switch 103 arranged between a column signal line 106 and the imaging element 102. The first detection element 121 includes a first conversion element 122 configured to convert radiation into an electrical signal, and a first switch 123 arranged between a first signal line 125 and the first conversion element 122. The second detection element 301 includes a second conversion element 302 configured to convert radiation into an electrical signal and a second switch 303 arranged between a second signal line 305 and the second conversion element 302. The first detection element 121 and the second detection element 301 can be arranged on the same column in some of the plurality of imaging pixels 101. In addition, the second detection element 301 is arranged near the same column such as that of the first detection element 121.

The imaging element 102, the first conversion element 122, and the second conversion element 302 can be arranged by a scintillator configured to convert radiation into light and photoelectric conversion elements configured to convert light into electrical signals. The scintillator can be formed in a sheet shape so as to cover the imaging region IR and can be shared by the plurality of pixels. The imaging element 102, the first conversion element 122, and the second conversion element 302 can be arranged by conversion elements configured to directly convert radiation into electrical signals.

The connection switch 103, the first switch 123, and the second switch 303 can be arranged by thin film transistors (TFTs) each made of a semiconductor such as amorphous silicon or polysilicon.

The radiation imaging apparatus 200 includes a plurality of column signal lines 106 and a plurality of driving lines 104. Each column signal line 106 corresponds to one of the plurality of columns in the imaging region IR. Each driving line 104 corresponds to one of the plurality of rows in the imaging region IR. Each driving line 104 is driven by a row selection unit 221. The driving line 104 is connected to the control electrode of the connection switch 103. When the driving line 104 is driven to high level, the connection switch 103 is rendered conductive.

The first electrode of the imaging element 102 is connected to the first main electrode of the connection switch 103, and the second electrode of the imaging element 102 is connected to a bias line 108. In this case, one bias line 108 extends in the column direction and commonly connected to the second electrodes of the plurality of imaging elements 102 arrayed in the column direction. Each bias line 108 receives a bias voltage Vs from a power supply circuit 226. The second electrodes of the connection switches 103 of the plurality of imaging pixels 101 constituting one column are connected to one column signal line 106. The control electrodes of the connection switches 103 of the plurality of imaging pixels 101 constituting one row are connected to one driving line 104.

The plurality of column signal lines 106 are connected to a readout unit 130. In this case, the readout unit 130 can include a plurality of detection units 132, a multiplexer 134, and an analog-to-digital converter (to be referred to as an A/D converter) 136. The plurality of column signal lines 106 are connected to the corresponding detection units 132 of the plurality of detection units 132 of the readout unit 130. In this case, one column signal line 106 corresponds to one detection unit 132. Each detection unit 132 can include a differential amplifier. The multiplexer 134 selects the plurality of detection units 132 in a predetermined order, and the signal from the selected detection unit 132 is supplied to the A/D converter 136. The A/D converter 136 converts the received signal into a digital signal and outputs the digital signal.

The first electrode of the first conversion element 122 of the first detection element 121 is connected to the first main electrode of the first switch 123. The second electrode of the first conversion element 122 is connected to the bias line 108. The second main electrode of the first switch 123 is connected to the first signal line 125. The control electrode of the first switch 123 is electrically connected to a driving line 124. The radiation imaging apparatus 200 can include the plurality of first signal lines 125. One or the plurality of first detection elements 121 can be connected to one first signal line 125. The driving line 124 is driven by a driving unit 241. One or the plurality of first detection elements 121 can be connected to one driving line 124. When the driving line 124 is driven to high level by the driving unit 241, the first switch 123 is rendered conductive.

The first electrode of the second conversion element 302 of the second detection element 301 is connected to the first main electrode of the second switch 303. The second electrode of the second conversion element 302 is connected to the bias line 108. The second main electrode of the second switch 303 is connected to the second signal line 305. The control electrode of the second switch 303 is electrically connected to the driving line 124. The radiation imaging apparatus 200 can include the plurality of second signal lines 305. One or the plurality of second detection elements 301 can be connected to one second signal line 305. The driving line 124 is driven by the driving unit 241. One or the plurality of second detection elements 301 can be connected to one driving line 124. When the driving line 124 is driven to high level by the driving unit 241, the second switch 303 is rendered conductive.

The first signal line 125 and the second signal line 305 are connected to a readout unit 140. In this case, the readout unit 140 can include a plurality of detection units 142 and 143, a multiplexer 144, and an A/D converter 146. The plurality of first signal lines 125 are connected to the corresponding detection units 142 of the plurality of detection unit 142 of the readout unit 140. The plurality of second signal lines 305 can be connected to the corresponding detection units 143 of the plurality of detection units 143 of the readout unit 140. In this case, one first signal line 125 or one second signal line 305 corresponds to one detection unit 142 or one detection unit 143. Each of the detection units 142 and 143 can include a differential amplifier. The multiplexer 144 sequentially selects the plurality of detection units 142 and 143 in a predetermined order and supplies the signal from the selected detection unit 142 or 143 to the A/D converter 146. The A/D converter 146 converts the received signal into a digital signal and outputs the digital signal.

The output from the A/D converter 146 of the readout unit 140 is supplied to a signal processing circuit 224 and processed by the signal processing circuit 224. The signal processing circuit 224 generates and outputs information concerning the radiation irradiation to the radiation imaging apparatus 200 based on the output from the A/D converter 146 of the readout unit 140. More specifically, the signal processing circuit 224 can detect the start of the radiation irradiation to the radiation imaging apparatus 200 and calculates the radiation dose and/or the integrated irradiation dose. A control unit 225 controls a row selection unit 221, the driving unit 241, and the readout unit 130 based on the information from the signal processing circuit 224. The control unit 225 can output, to the outside, the signal for controlling the start and end of radiation irradiation based on the information from the signal processing circuit 224. The control unit 225 controls the start and end of accumulation of charges corresponding to the radiation with which the imaging pixel 101 is irradiated.

Figure 2:
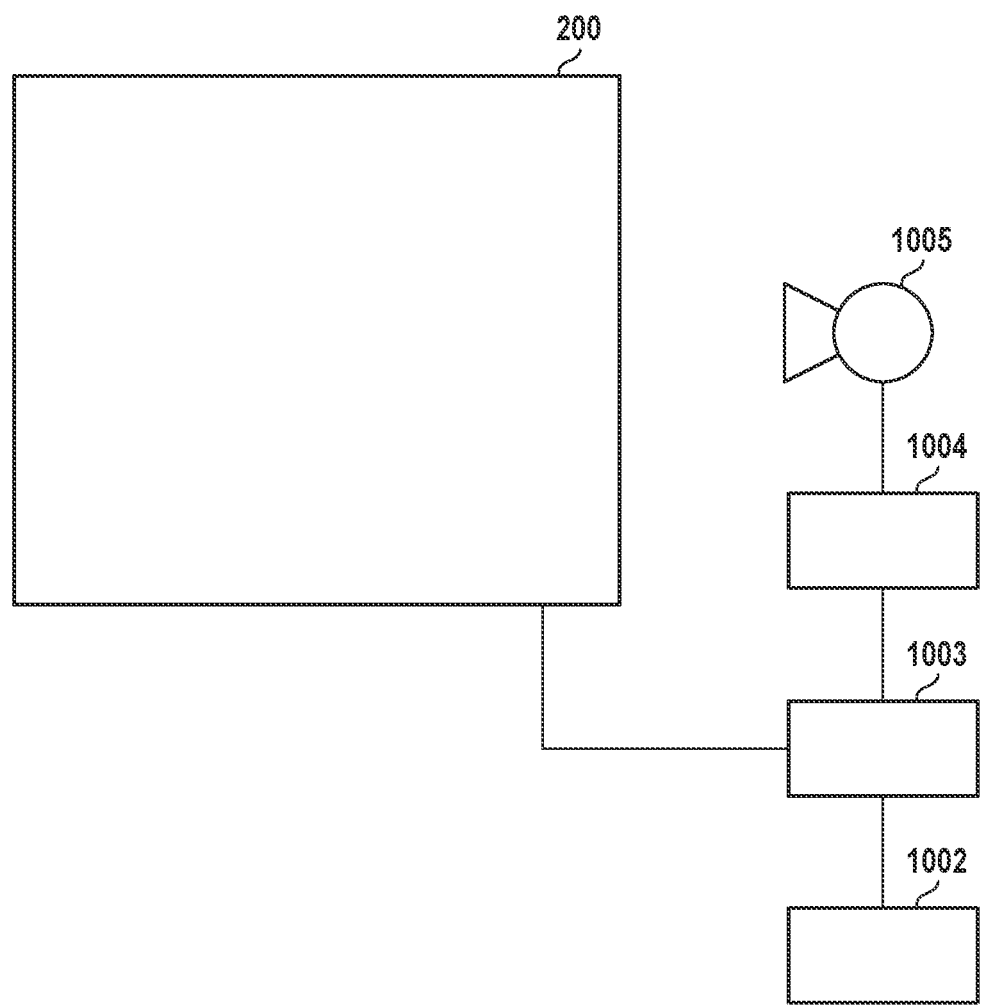
FIG. 2 is a view showing an example of the arrangement of a radiation imaging system including the radiation imaging apparatus.

FIG. 2 exemplifies the arrangement of a radiation imaging system including the radiation imaging apparatus 200. The radiation imaging system includes a controller 1002, an interface 1003, a radiation source interface 1004, and a radiation source 1005 in addition to the radiation imaging apparatus 200.

The controller 1002 can receive an irradiation dose A, an irradiation time B (ms), radiation source tube current C (mA), radiation source tube voltage D (kV), a radiation detection region (ROI) as a region in which radiation is to be monitored, and the like. When an exposure switch mounted on the radiation source 1005 is operated, the radiation is emitted from the radiation source 1005. The control unit 225 sends an exposure stop signal to the radiation source interface 1004 via the interface 1003 when the integrated value of the signals read out from the first detection element 121 arranged in the radiation detection region (ROI) reaches a dose A'. In response to this, the radiation source interface 1004 stops radiation irradiation to the radiation source 1005. In this case, the control unit 225 can decide the dose A' based on the dose A, radiation irradiation intensity, a communication delay between the units, a processing delay, and the like. In addition, when the radiation irradiation time reaches the irradiation time B, the radiation source 1005 stops radiation irradiation regardless of the presence/absence of the exposure stop signal.

In this embodiment, image information of a location where the first detection element 121 and the second detection element 301 are arranged cannot be read out. However, the interpolation processing can be performed using outputs from the imaging pixels 101 around the first detection element 121 and the second detection element 301, so that the image information of the location where the first detection element 121 and the second detection element 301 are arranged can be obtained.

Figure 3:
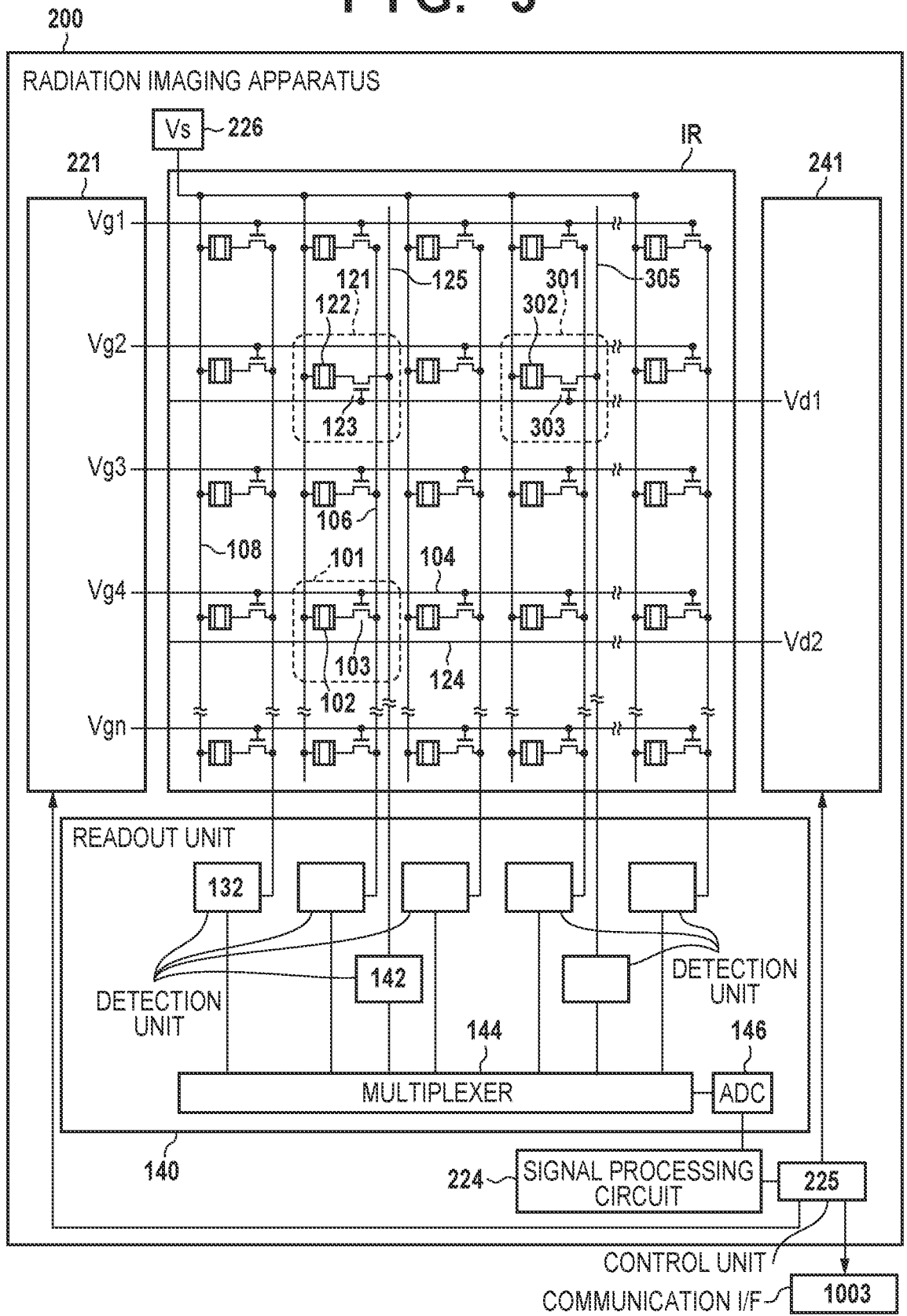
FIG. 3 is a view showing another arrangement of the radiation imaging apparatus according to the first embodiment of the present invention.

In the arrangement example shown in FIG. 1, although the signal from the imaging pixel 101 and the signals from the first detection element 121 and the second detection element 301 are read out by the separate readout units 130 and 140, these signals may be read out by the common readout unit 140, as shown in FIG. 3. In addition, in FIG. 1, the driving lines and the signal lines of the imaging pixel 101 and the first detection element 121 and the second detection element 301 are arranged independently of each other, but may be shared.

Figure 4:
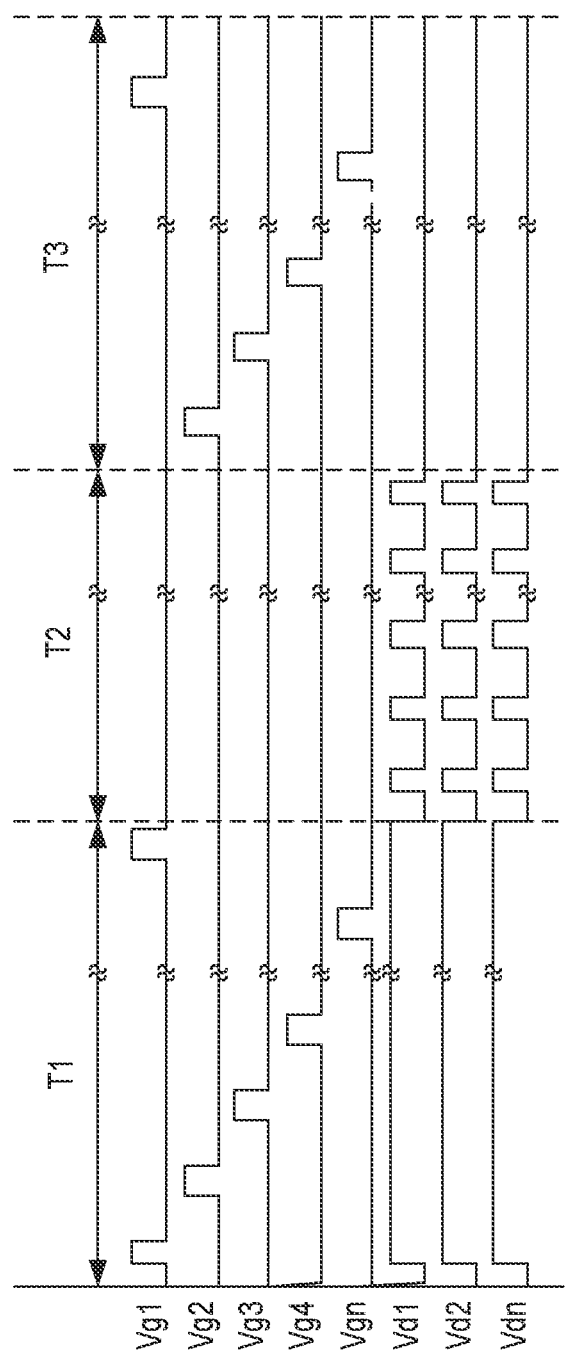
FIG. 4 is a timing chart showing an operation of the radiation imaging apparatus according to the first embodiment of the present invention.

FIG. 4 exemplifies an operation of the radiation imaging apparatus 200 of this embodiment. In the following description, let Vg1 to Vgn be the signals applied to the driving lines 104 for driving the imaging pixels 101, and Vd1 to Vdn be signals applied to the driving lines 124 for driving the first detection element 121 and the second detection element 301. When the signals supplied to the control electrodes of the connection switch 103, the first switch 123, and the second switch 303 are set at high level, these switches are set in the conductive state. However, when the signals are set at low level, these switches are set in a nonconductive state.

A period T1 is a period until the start of the radiation irradiation. More specifically, the period T1 is a period from a time when the power supply of the radiation imaging apparatus 200 is turned on and the radiation image is set in an imaging enable state until the exposure switch of the radiation source 1005 is operated to detect radiation irradiation In the period T1, the signals Vd1 to Vdn are fixed to high level, and the first switch 123 of the first detection element 121 is fixed to the conductive state. The signal read out from the first detection element 121 by the readout unit 140 is processed by the signal processing circuit 224 to detect the start of radiation irradiation. When the start of radiation irradiation is detected, the state shifts to the period T2. In the period T1, since the dark current generated by the imaging element 102 is removed, it is desirable to periodically reset the potentials of the respective imaging elements 102 to a constant potential. In this example, in the reset mode of the period T1, the voltages Vg1 to Vgn of the respective driving lines 104 are sequentially set to high level, and the imaging elements 102 are electrically connected to the corresponding column signal line 106 fixed to the constant voltage. Accordingly, accumulation of the charges by the dark current in each imaging element 102 for a long time can be prevented. The length of the period T1 greatly changes depending on the imaging method, imaging conditions, and the like but can fall within the range of several sec to several min.

The period T2 is a period in which the imaging element 102 is irradiated with radiation. As an example, the period T2 is a period in which the exposure amount of the radiation reaches a predetermined dose after detection of the start of radiation irradiation. The period T2 is also referred to as a period in which the dose of the radiation is being monitored. In the period T2, the signals Vd1 to Vdn are intermittently set to high level, and the first switch 123 of the first detection element 121 is intermittently set in the conductive state. At the same time, the second switch 303 of the second detection element 301 connected to the corresponding driving line 124 is also intermittently set in the conductive state. The signals read out from the first detection element 121 and the second detection element 301 via the first signal line 125 and the second signal line 305 by the readout unit 140 are processed by the signal processing circuit 224 to detect the dose. In the period T2, the voltages Vg1 to Vgn applied to the respective driving lines 104 are set to low level. Accordingly, the generated charges are accumulated in the imaging elements 102 of the imaging pixels 101. The length of the period T2 greatly changes depending on the imaging method, imaging conditions, and the like but can fall within the range of 1 msec to several hundred msec.

The control unit 225 shifts the operation of the radiation imaging apparatus 200 to that of a period T3 when an integrated value of the signals read out from the first detection elements 121 arranged in the radiation detection region (ROI) reaches the dose A'. At this time, the control unit 225 sends the exposure stop signal to the radiation source interface 1004 via the interface 1003.

The period T3 is a period in which the signal accumulated in the imaging pixels 101 with the radiation is read out after the end of the radiation irradiation. In the period T3, the signals Vd1 to Vdn are set to low level. In order to prevent floating of the first signal line 125 and the second signal line 305, the first signal line 125 and the second signal line 305 are connected to the fixed potential in the period T3.

In the period T3, in order to scan the plurality of rows, Vg1 to Vgn are sequentially set to high level. The signals accumulated in the imaging pixels 101 are read out by the readout unit 140 in FIG. 3 (the readout unit 130 in FIG. 1). In this embodiment, the timings at which Vg1 to Vgn are applied are adjusted such that the accumulation times in the imaging pixels 101 are set constant. That is, in accordance with the row to which the high-level signal is finally applied to perform resetting in the period T1, the row to which the high-level signal is applied first in the period T3 is decided. In FIG. 4, since the row to which the high-level signals is finally applied in the period T1 corresponds to the row of Vg1, the high-level signal is sequentially applied from the row corresponding to Vg2 in the period T3.

In this embodiment, since the first signal line 125 connected to the first conversion element 122 serving as the conversion element of the first detection element 121 is a signal line independently of the column signal line 106 to read out the signal from the imaging pixel 101, the imaging pixel 101 is not connected. Therefore, the influence of the parasitic capacitance to the first signal line 125 can be reduced. Accordingly, the radiation irradiation can be monitored with high responsiveness.

In addition, in this embodiment, by arranging the first switch 123 in the first detection element 121, the radiation irradiation can be detected for each first detection element 121 while reducing the number of first signal lines 125. The arrangement capable of detecting radiation for each first detection element 121 or for each radiation detection region (ROI) including at least one first detection element 121 contributes to implementation of more appropriate dose control and exposure control.

Figure 5:
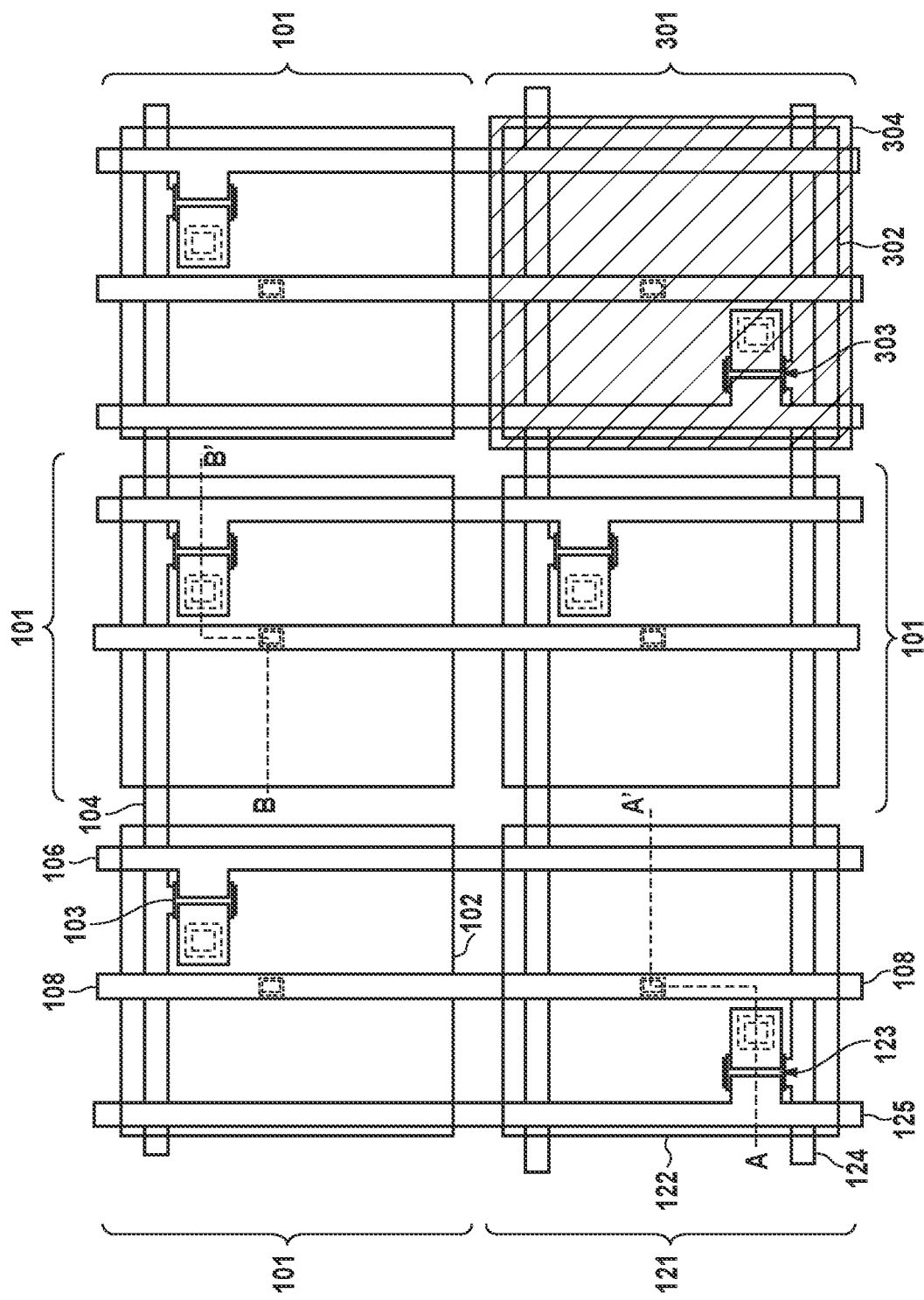
FIG. 5 is a plan view showing the arrangement of imaging pixels, a first detection element, and a second detection element in the radiation imaging apparatus according to the first embodiment of the present invention.
Figure 6A:
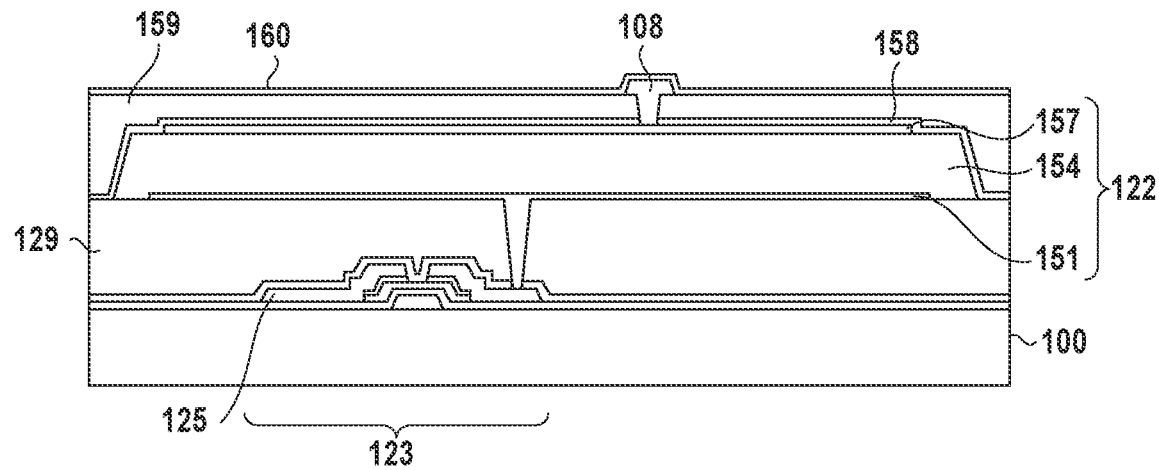
FIG. 6A is a sectional view taken along a line A-A' in FIG. 5.
Figure 6B:
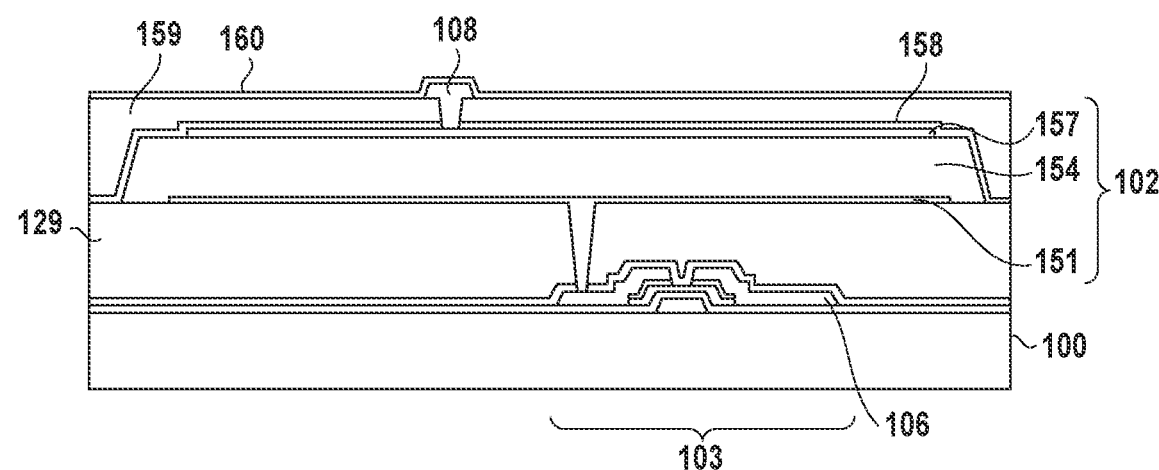
FIG. 6B is a sectional view taken along a line B-B' in FIG. 5.

FIG. 5 is a plan view showing the arrangement of the imaging pixels 101, the first detection element 121, and the second detection element 301 in the radiation imaging apparatus 200 of this embodiment. In this case, the plan view is equivalent to the orthographic projection to the plane parallel to the imaging region IR of the radiation imaging apparatus 200. FIG. 6A is a sectional view along a line A-A' in FIG. 5, and FIG. 6B is a sectional view along a line B-B' in FIG. 5.

As exemplified in FIGS. 5 and 6A, the first detection element 121 includes the first conversion element 122 and the first switch 123. In this embodiment, the first conversion element 122 can be a photoelectric conversion element configured to convert light converted from the radiation by a scintillator (not shown) into charges and accumulate the charges. Note that the first conversion element 122 may be arranged so as to directly convert the radiation into charges. The first switch 123 includes a TFT (Thin Film Transistor) configured to output an electrical signal in accordance with the charges accumulated in the first conversion element 122. The first conversion element 122 can be a PIN photodiode 154. The first conversion element 122 is connected to the first signal line 125 via the first switch 123. The first conversion element 122 can be arranged to sandwich an interlayer insulating layer 129 on the first switch 123 arranged on the insulating support substrate 100 such as a glass substrate. The first conversion element 122 is formed by a first electrode 151, the PIN photodiode 154, and a second electrode 157.

A protection film 158, a second interlayer insulating layer 159, the bias line 108, and a protection film 160 are sequentially arranged on the first conversion element 122. A planarizing film and the scintillator (not shown) are arranged on the protection film 160. The second electrode 157 is connected to the bias line 108 via a contact hole. ITO having the light transmission property or the like is used for the second electrode 157, and light converted from the radiation by the scintillator can be transmitted through the second electrode 157.

As exemplified in FIG. 5, the second detection element 301 includes the second conversion element 302 and the second switch 303. The arrangement of the second detection element 301 is similar to that of the first detection element 121 exemplified in FIG. 6A. In addition to the arrangement of the first detection element 121, the second detection element 301 includes a shielding member 304 between the second conversion element 302 and the scintillator (not shown) arranged above the imaging region. In this embodiment, the second detection element 301 and the second conversion element 302 are entirely covered with the shielding member 304. That is, the sensitivity to the incident radiation greatly lowers. The shielding member 304 can be a shielding member which does not transmit light if the second conversion element 302 is formed by a photoelectric conversion element as in the first conversion element 122.

As exemplified in FIGS. 5 and 6B, the imaging pixels 101 includes the imaging element 102 and the connection switch 103. As in the first conversion element 122, the imaging element 102 can be a photoelectric conversion element configured to convert light converted from the radiation by the scintillator (not shown) into charges and accumulate the charges. Note that the imaging element 102 may be arranged to directly convert the radiation into the charges. The connection switch 103 includes a TFT (Thin Film Transistor) configured to output an electrical signal corresponding to the charges accumulated in the imaging element 102. The imaging element 102 can be the PIN photodiode 154. The imaging element 102 is connected to the column signal line 106 via the connection switch 103. The imaging element 102 can be arranged to sandwich the interlayer insulating layer 129 on the connection switch 103 arranged on the insulating support substrate 100 such as a glass substrate. The imaging element 102 is formed by the first electrode 151, the PIN photodiode 154, and the second electrode 157. Each of the imaging element 102 and the first conversion element 122 may be formed by a MIS sensor.

Figure 7:
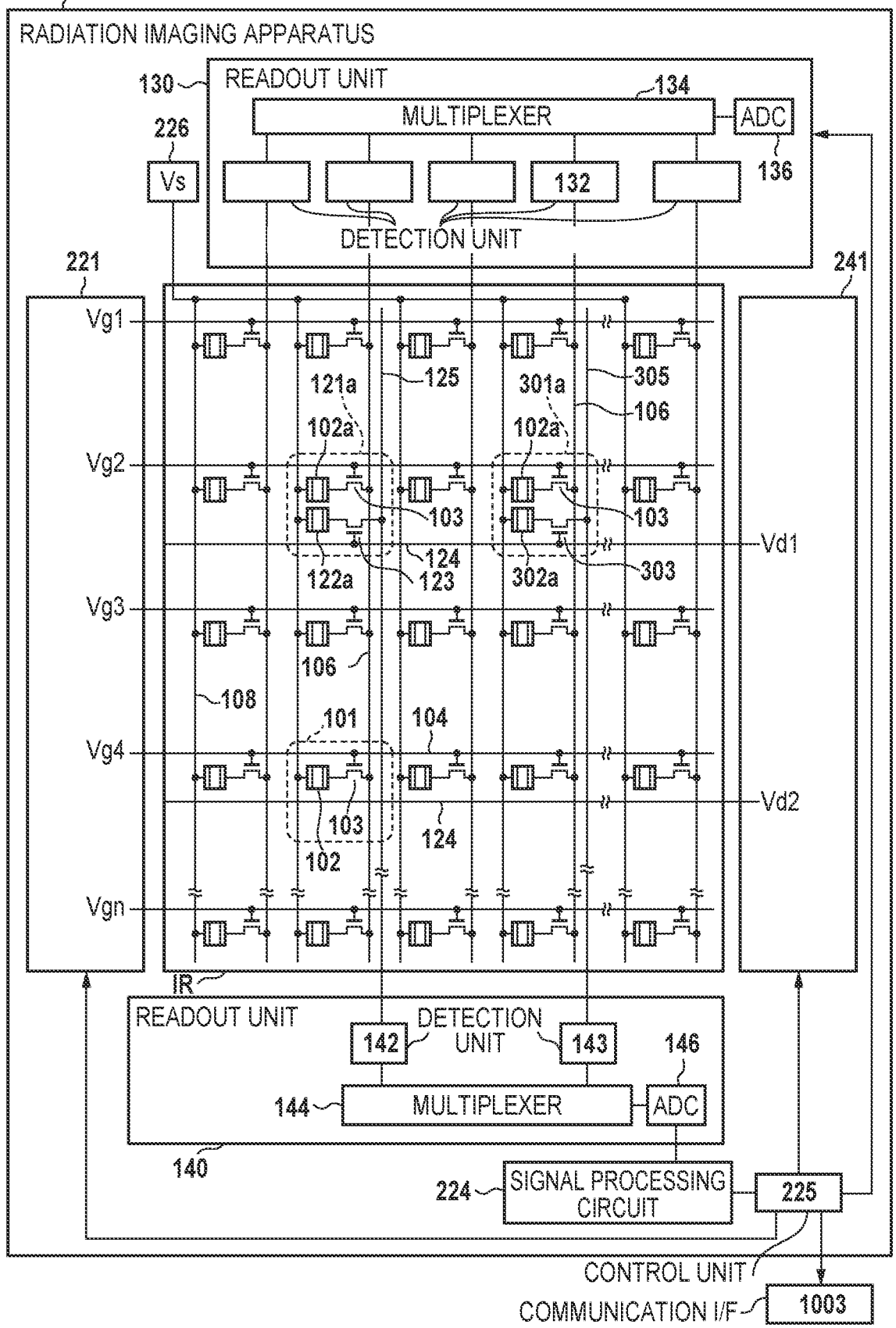
FIG. 7 is a view showing still another arrangement of the radiation imaging apparatus according to the first embodiment of the present invention.

FIG. 7 is an equivalent block diagram showing the circuit arrangement of the radiation imaging apparatus 200 according to this embodiment and shows a modification of the circuit arrangement shown in FIGS. 1 and 3. This equivalent block diagram is different from that shown in FIGS. 1 and 2 in that the first detection element and imaging pixel and the second detection element and imaging pixel are formed by a pair of pixels 121a and a pair of pixels 301a in place of the first detection element 121 and the second detection element 301. Other than this, the radiation imaging apparatus 200 is similar to the radiation imaging apparatus 200 shown in FIGS. 1 and 3. By arranging an imaging conversion element in a region where the radiation detection conversion element is arranged, the missing of pixels can be suppressed, and image correction can be facilitated.

Figure 8A:
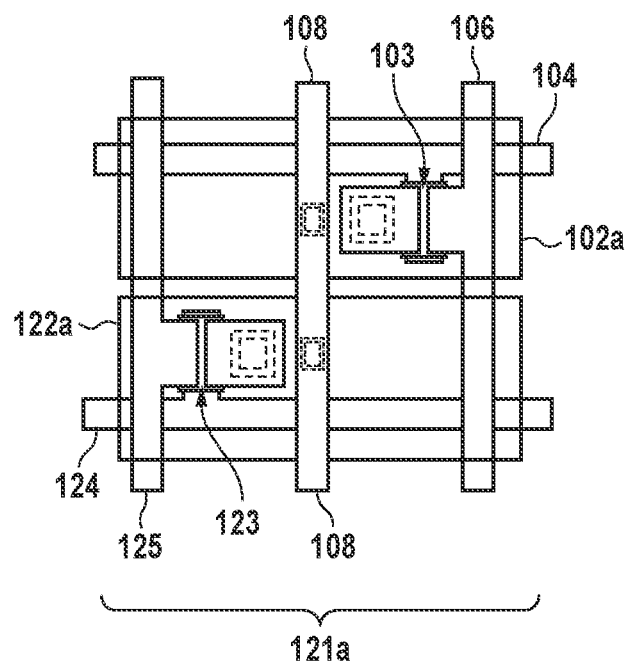
FIG. 8A is a plan view showing the arrangement of a pixel in the radiation imaging apparatus shown in FIG. 7.
Figure 8B:
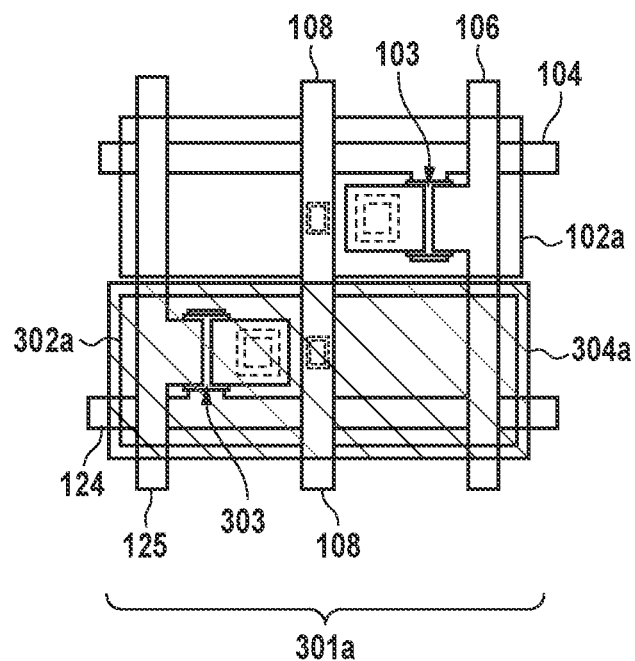
FIG. 8B is a plan view showing the arrangement of a pixel in the radiation imaging apparatus shown in FIG. 7.

FIG. 8A is a plan view of the pixel 121a and FIG. 8B is a plan view of the pixel 301a. The upper half of the pixel 121a has an arrangement similar to that of the imaging pixel 101 and includes a conversion element 102a having an area smaller than that of the imaging element 102 of the imaging pixel 101. The lower half of the pixel 121a has an arrangement similar to that of the first detection element 121 and includes a conversion element 122a having an area smaller than that of the first conversion element 122 of the first detection element 121. The upper half of the pixel 301a has an arrangement similar to that of the imaging pixel 101 and includes a conversion element 102a having an area smaller than that of the imaging element 102 of the imaging pixel 101. The lower half of the pixel 301a has an arrangement similar to that of the second detection element 301 and includes a conversion element 302a having an area smaller than that of the second conversion element 302 of the second detection element 301. A shielding member 304a to the radiation is formed between the conversion element 302a and the scintillator (not shown) arranged above the pixel 301a. The conversion element 302a is entirely covered with the shielding member 304a. Although the area of the conversion element 102a is the area which is about ½ that of the imaging element 102 of the imaging pixel 101, an output equivalent to that of the imaging pixel 101 can be obtained by image processing such as offset correction or gain correction. The conversion element 302a and the second switch 303 arranged in the pixel 301a may have the same structure such as that of the conversion element 122a and the first switch 123 arranged in the pixel 121a. When photoelectric conversion elements are used for the scintillator and the conversion element 302a, members having the light shielding property can be used as the shielding members.

Figure 9:
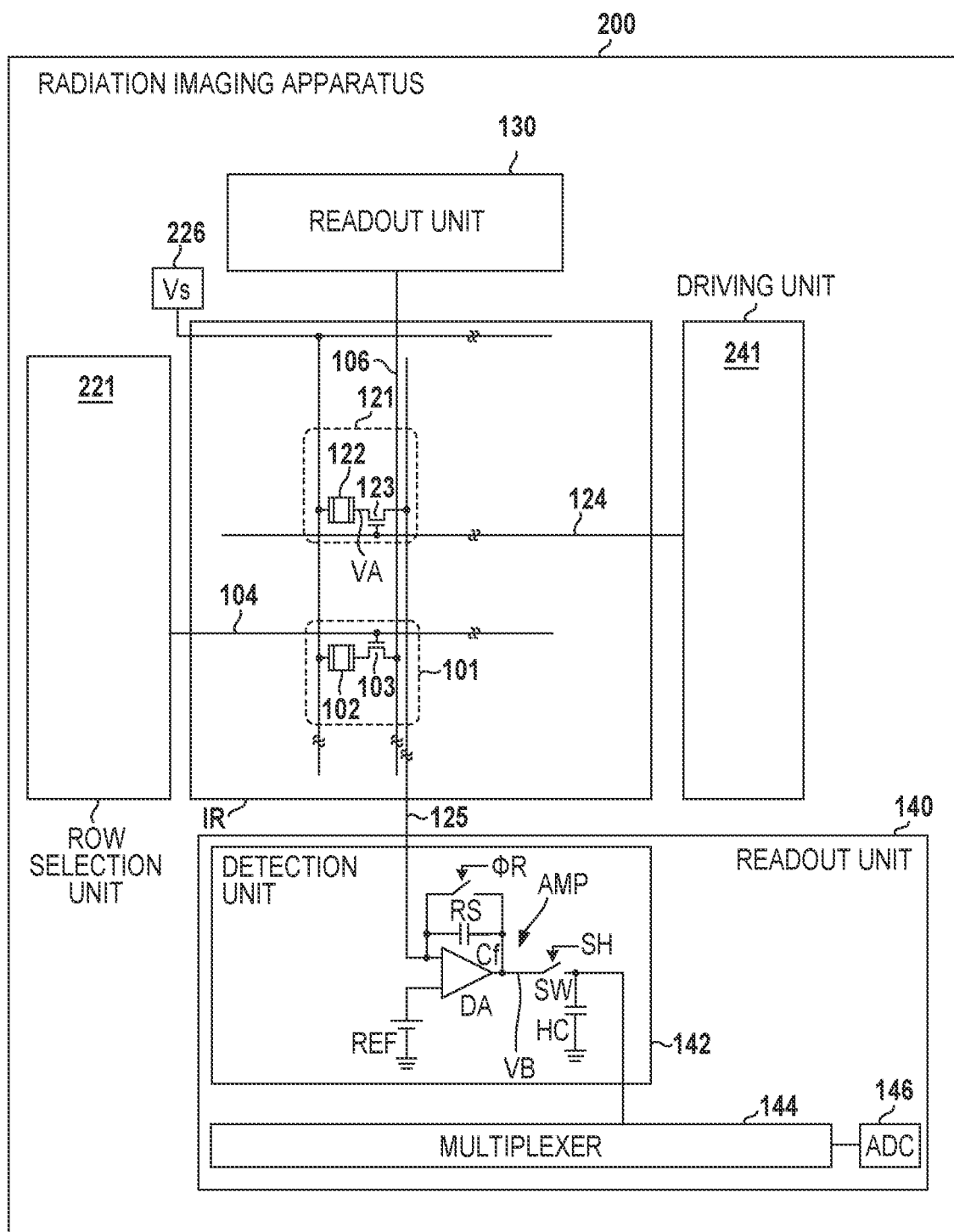
FIG. 9 is a view showing an arrangement of the radiation imaging apparatus according to the first embodiment of the present invention.
Figure 10:
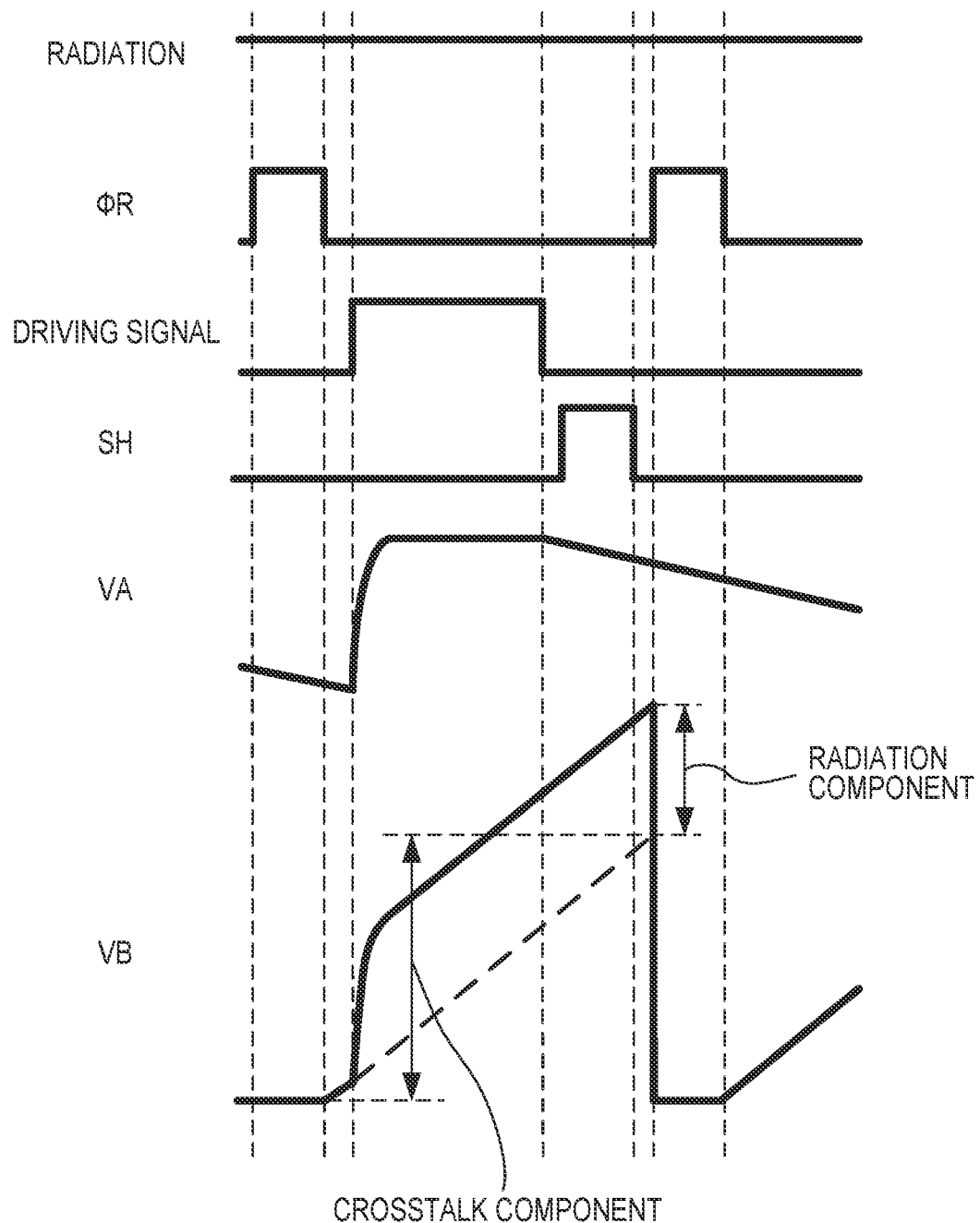
FIG. 10 is a timing chart of a comparative example.

The arrangement and operation of the readout unit 140 will be described with reference to FIGS. 9 to 11. FIG. 9 shows an example of the arrangement of the readout unit 140 configured to read out the signal from the first detection element 121.

The detection unit 142 of the readout unit 140 includes an amplifier circuit, a holding capacitor HC, and a sampling switch SW. The amplifier circuit includes a differential amplifier DA having the first input terminal, the second input terminal, and the output terminal, a feedback capacitor Cf arranged in parallel to the first input terminal and the output terminal, and a reset switch RS functioning as a reset unit. The first signal line 125 is connected to the first input terminal, and a reference potential REF (the fixed potential) is supplied to the second input terminal. The sampling switch SW is arranged between the output terminal of the differential amplifier DA and a holding capacitor HC. The potential of the first electrode 151 of the first conversion element 122 of the first detection element 121 is set to a potential VA. The potential of the output terminal of the differential amplifier DA (the amplifier circuit) is set to a potential VB. Note that the "radiation" in each of FIGS. 10 and 11 indicates a dose of the radiation to be emitted. The "driving signal" indicates the level of a signal applied to the driving line 124.

A case in which the dose generated by the radiation source does not change is given as a comparative example and will be described with reference to FIG. 10. In a time (the period T2 in FIG. 4) during radiation irradiation, the potential of the first electrode 151 of the imaging pixel 101 varies. Along with this, the potential of the first electrode influences (crosstalk) via the parasitic capacitor formed between the first electrode 151 and the first signal line 125 to which the first detection element is connected, thereby changing the potential of the first signal line 125. The potential VB of the output terminal of the differential amplifier DA varies due to the variation of the potential appearing on the first signal line. In FIG. 10, the "crosstalk component" indicated by the potential VB indicates a change in VB corresponding to the change in potential of the first signal line 125 by the crosstalk. In addition, the "radiation component" appearing in the potential VB when the driving signal is set to high level indicates a change in VB corresponding to the change in potential (corresponding to the charges accumulated in the first conversion element 122) of the first signal line 125 by rendering the first switch 123 conductive. Therefore, the signal accumulated in the holding capacitor HC by setting a sampling signal SH to high level and rendering the sampling switch SW conductive becomes a signal containing the "crosstalk component" and the "radiation component".

An operation for reducing the influence of the crosstalk when the dose generated by the radiation source based on this embodiment is changed in the period T2 will now be described with reference to FIG. 11. The dose of the radiation generated by the radiation source instantaneously changes as indicated by the "radiation" in FIG. 11. As an example, FIG. 11 shows a case in which the dose of the radiation changes (at the time of activating the radiation source). VA1 is the potential of the first electrode 151 of the first detection element 121, and VB1 is the potential of the output terminal of the differential amplifier DA to which the first detection element is connected. The detection unit 143 is also connected to the second signal line 305 to which the second switch 303 of the second detection element 301 is connected. The detection unit 143 to which the second signal line 305 is connected also has an arrangement similar to the detection unit 142 to which the first signal line 125 shown in FIG. 9 is connected. In this case, the potential of the first electrode 151 of the second detection element 301 is set to VA2, and the potential of the output terminal of the differential amplifier DA of the detection unit 143 to which the second signal line 305 is connected is set to VB2. A reset signal φR and the sampling signal SH are simultaneously applied to the detection unit 142 and the detection unit 143. First, the reset signal φR is set to high level at time t0, so that the reset switch RS is set in the conductive state. Accordingly, the output potentials VB1 and VB2 of the differential amplifier DA are simultaneously reset to a reference potential REF. When the reset signal φR is set to low level and the reset switch RS becomes a non-conductive state (time t1), the potentials of the first signal line 125 and the second signal line 305 change due to the crosstalk. In accordance with this change, the potentials VB1 and VB2 of the differential amplifier DA start to change due to the crosstalk.

Next, by changing the sampling signal SH from low level to high level and further changing the sampling signal SH from high level to low level, sampling of the holding capacitor HC is performed (from time t2). Accordingly, signals C1 and C1' corresponding to the crosstalk components appearing on the first signal line 125 and the second signal line 305 are simultaneously held in the holding capacitors HC of the detection unit 142 and the detection unit 143. The signals C1 and C1' are output via the multiplexer 144 and the A/D converter 146.

Next, at time t3, the reset signal cpR is set to high level, and the reset switch RS is set in the conductive state. Accordingly, the output potentials VB1 and VB2 of the differential amplifier DA are simultaneously reset to the reference potential REF. When the reset signal cpR is set to low level and the reset switch RS is set in the non-conductive state (time t4), the output potentials VB1 and VB2 of the differential amplifier DA start to change by the crosstalk.

Next, in the period from time t5 to time t6, the potential (the driving signal) of the driving line 124 is set to high level to simultaneously set the first switch 123 and the second switch 303 in the conductive state. At this time, VB1 is changed in accordance with the amount of charges accumulated in the first conversion element 122. On the other hand, the second conversion element 302 is shielded by the shielding member 304, so that the sensitivity to the radiation is set to greatly lower. Almost no charges by the radiation irradiation are accumulated in the second conversion element 302. For this reason, only the crosstalk component is contained in VB2. Even if the first switch 123 and the second switch 303 are set in the conductive state, since the imaging apparatus is continuously irradiated with radiation, the output potentials VB1 and VB2 continuously change due to the crosstalk.

Next, by changing the sampling signal SH from low level to high level and further changing the sampling signal SH from high level to low level, the holding capacitors HC of the detection unit 142 and the detection unit 143 are sampled (from time t7). Accordingly, a crosstalk component C2 and a signal S corresponding to the radiation component are held in the holding capacitor HC in the detection unit 142 of the first detection element. On the other hand, since the sensitivity to the radiation of the second detection element is greatly low in the detection unit 143 of the second detection element, only a crosstalk component CT is held in the holding capacitor HC. Each signal is output via the multiplexer 144 and the A/D converter 146.

If the dose of the radiation does not change, the reset switch RS is set in the conductive state in the period of time t3 to time t4, the potential of the first signal line 125 is reset to the reference potential REF to set the crosstalk component C1 and the crosstalk component C2 to close values. In addition, by setting a period TT1 and a period TT2 in FIG. 11 to equal to each other, the difference between the crosstalk component C1 and the crosstalk component C2 is set small. The signal processing circuit 224 calculates the difference between a signal (S+C2) and the signal C1 to reduce the influence of the crosstalk component.

Figure 11:
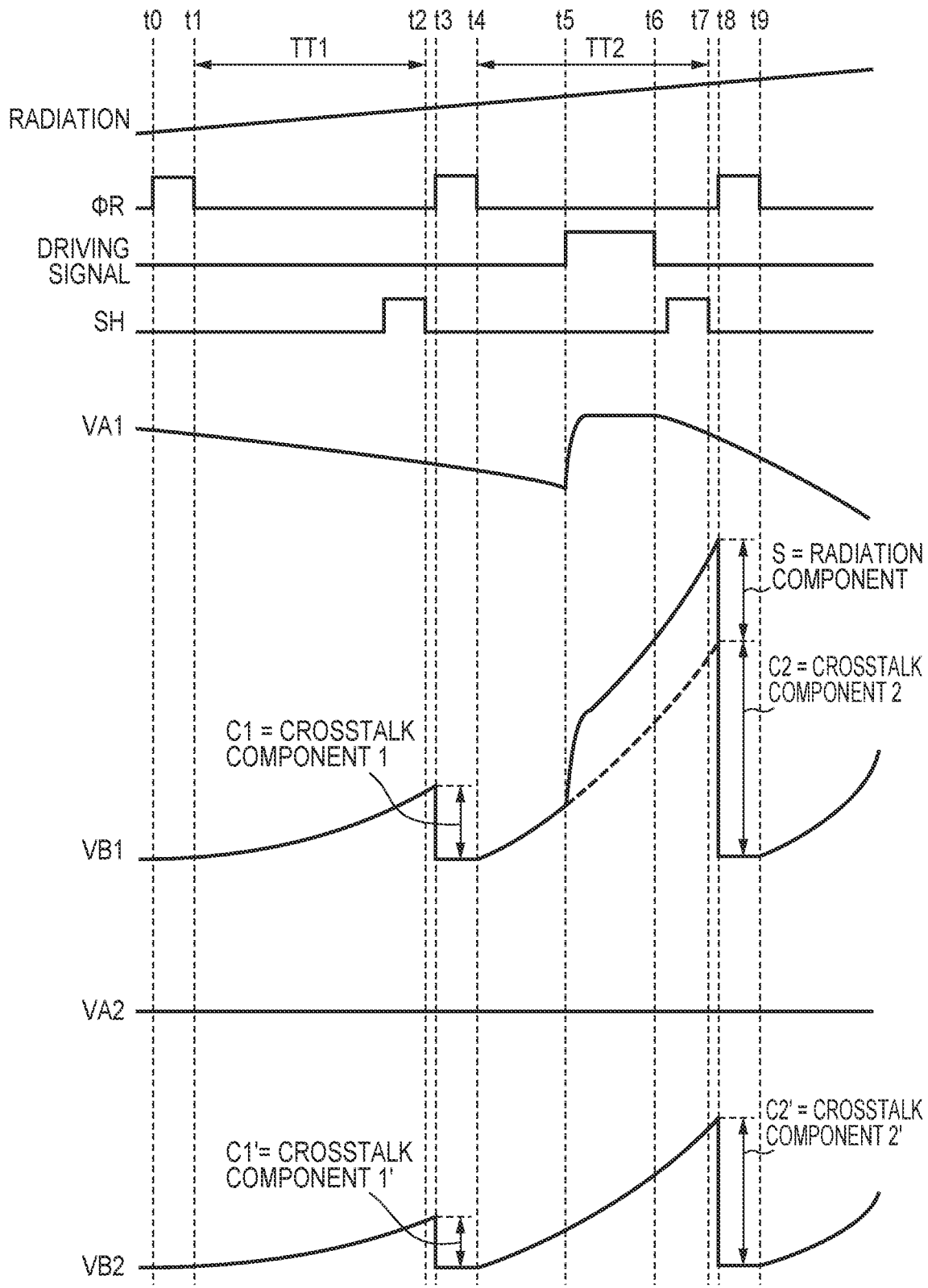
FIG. 11 is a timing chart showing an operation of the radiation imaging apparatus according to the first embodiment of the present invention.

However, as shown in FIG. 11, when the dose of the radiation to be emitted changes, the charge amount accumulated in an area per unit time changes, and the accumulation amount of the influence by the crosstalk component per unit time also changes. For this reason, the value of the crosstalk component C2 obtained at time t7 becomes different from the value of the crosstalk component C1 obtained at time t2. In this case, even if the difference between the signal (S+C2) and the signal C1 is calculated, the crosstalk component cannot be sufficiently reduced, and the radiation component cannot be accurately detected. In order to sufficiently reduce the influence of the crosstalk component, a ratio of change of the crosstalk component from time t2 to time t7 is calculated from the signals C1' and C2' as the crosstalk components read out from the second detection element 301 via the second signal line 305. This ratio of change is used for correction when the difference between the signal (S+C2) and the signal C1 read out from the first detection element 121 via the first signal line 125 is calculated. The change in crosstalk components for the signals from the first detection element 121 and the second detection element 301 is given such that the ratio of change does not change even if the arrangement position changes because the crosstalk components are generated by the same radiation irradiation. For this reason, by using the ratio of change of the crosstalk component obtained from the signals from the second detection element 301, the value of the crosstalk component for the first detection element 121 at time t7 can be accurately estimated. The influence of the crosstalk component can be reduced by the estimated crosstalk component, and the radiation component S can be more accurately detected. The influence of the crosstalk component can be reduced by the following equation (equation 1) using, as the correction value, the ratio of change (C2'/C1') of the crosstalk component obtained from the signals from the second detection element 301. The corrected detection signal S is obtained as follows:

$$\text{Detection signal } S = S + C2 - C1 * (C2'/C1') \quad (1)$$

As described above, the crosstalk component is removed by correction, and information concerning the radiation dose can be generated accurately based on the corrected detection signal S. In particular, in detection of the start of radiation irradiation, detection of the integrated irradiation dose (dose), or the like, a signal must be read out within a short period of time, and a small signal must be processed. In addition, in detection of the radiation integrated irradiation dose (dose), the radiation dose changes as a function of time to accumulate correction errors of the crosstalk components, thereby giving a large influence on the detection accuracy of the radiation dose. Therefore, the meaning for removing the crosstalk component by increasing the accuracy like the present invention is very significant. The accuracy of the dose can be improved by generating the dose using the signal obtained by such correction.

The embodiment in which the sensitivities of the first conversion element and the second conversion element are made different from each other by arranging the shielding member in the second conversion element has been described above. However, a method of setting different sensitivities is not limited to an arrangement in which the shielding member is arranged. The bias voltage applied to the first conversion element and the bias voltage applied to the second conversion element are set to different voltages to set the sensitivities of the first conversion element and the second conversion element to different sensitivities. In this case, by setting the bias voltage applied to the second conversion element to a lower value than that of the first conversion element, the sensitivity of the second conversion element is adjusted to be lower. Alternatively, by setting the size (the area) of the region of the first conversion element and the size of the area of the region of the second conversion element to be different from each other, different sensitivities may be set. In this case, by setting the region for detecting the radiation of the first conversion element to be larger than the region for detecting the radiation of the second conversion element, the sensitivity of the first conversion element can be set higher than that of the second conversion element.

Figure 12:
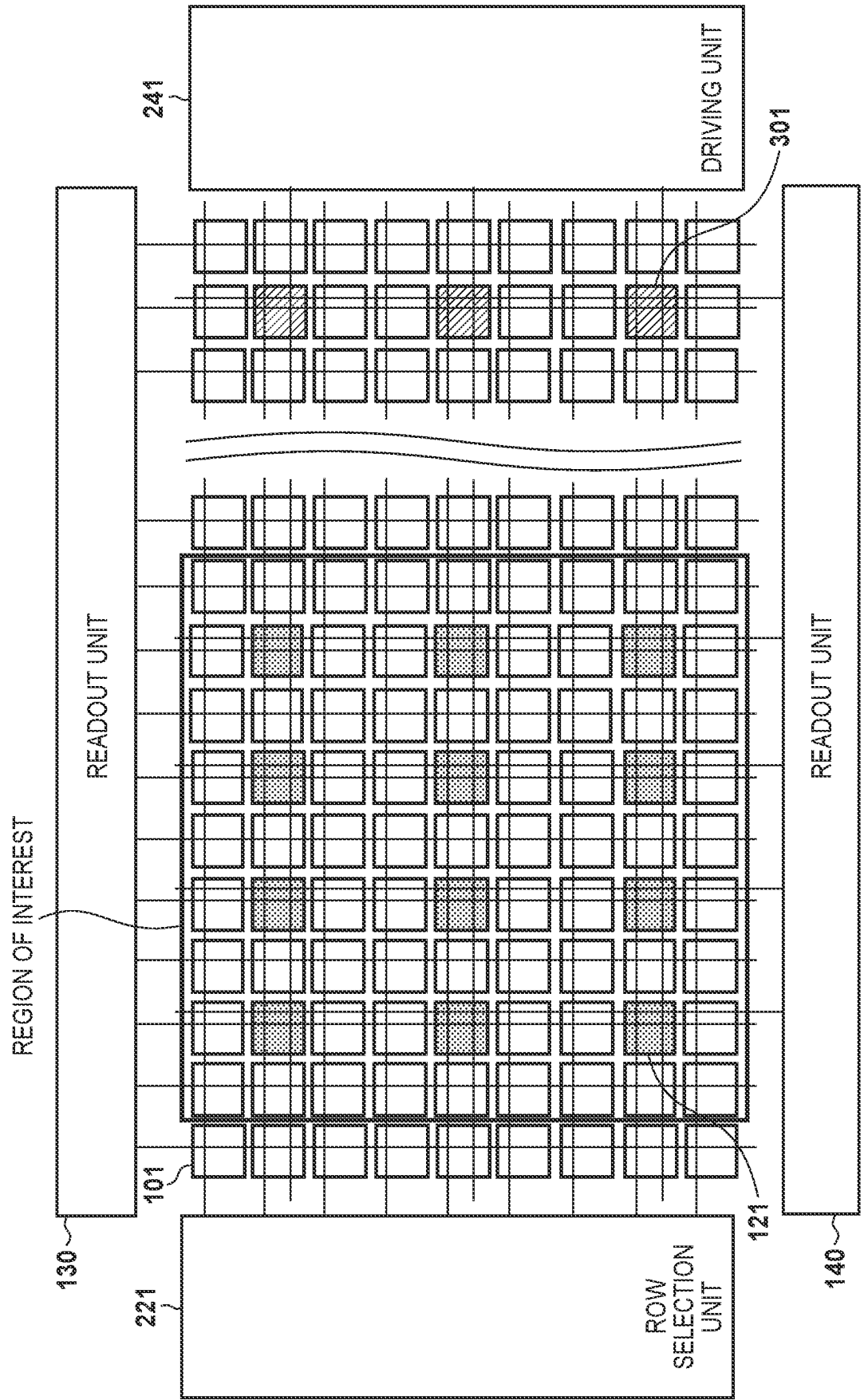
FIG. 12 is a view showing an example of the layout of detection elements.

Next, the example of the layout of first detection elements and second detection elements will be described below. In the example shown in FIG. 12, the plurality of first detection elements 121 are arranged in the region of interest of an image, and the second detection elements 301 connected to the same driving lines as those of the first detection elements are arranged at positions remote from the first detection elements in the region with which the radiation is irradiated. The second detection elements 301 are connected to the same driving lines as those of the corresponding first detection elements 121. Since the second signal lines 305 connected to the second detection elements 301 are arranged in a region with which the radiation is irradiated, the second signal lines 305 receive the influence of the crosstalk from the surrounding pixels.

In a case in which the first detection element is positioned in the region of interest of the image, if the second detection element 301 is arranged near the first detection element 121, the location where image information in the region of interest cannot be obtained increases by the number of second detection elements 301. If the number of locations where the image information cannot be obtained is large in the region of interest, important image information may not be obtained with sufficiently high accuracy in the diagnosis. However, when the second detection element is arranged in the peripheral portion of the imaging region remote from the first detection element located outside the region of interest, the number of locations where the image information of the region of interest cannot be obtained can be decreased.

Figure 13:
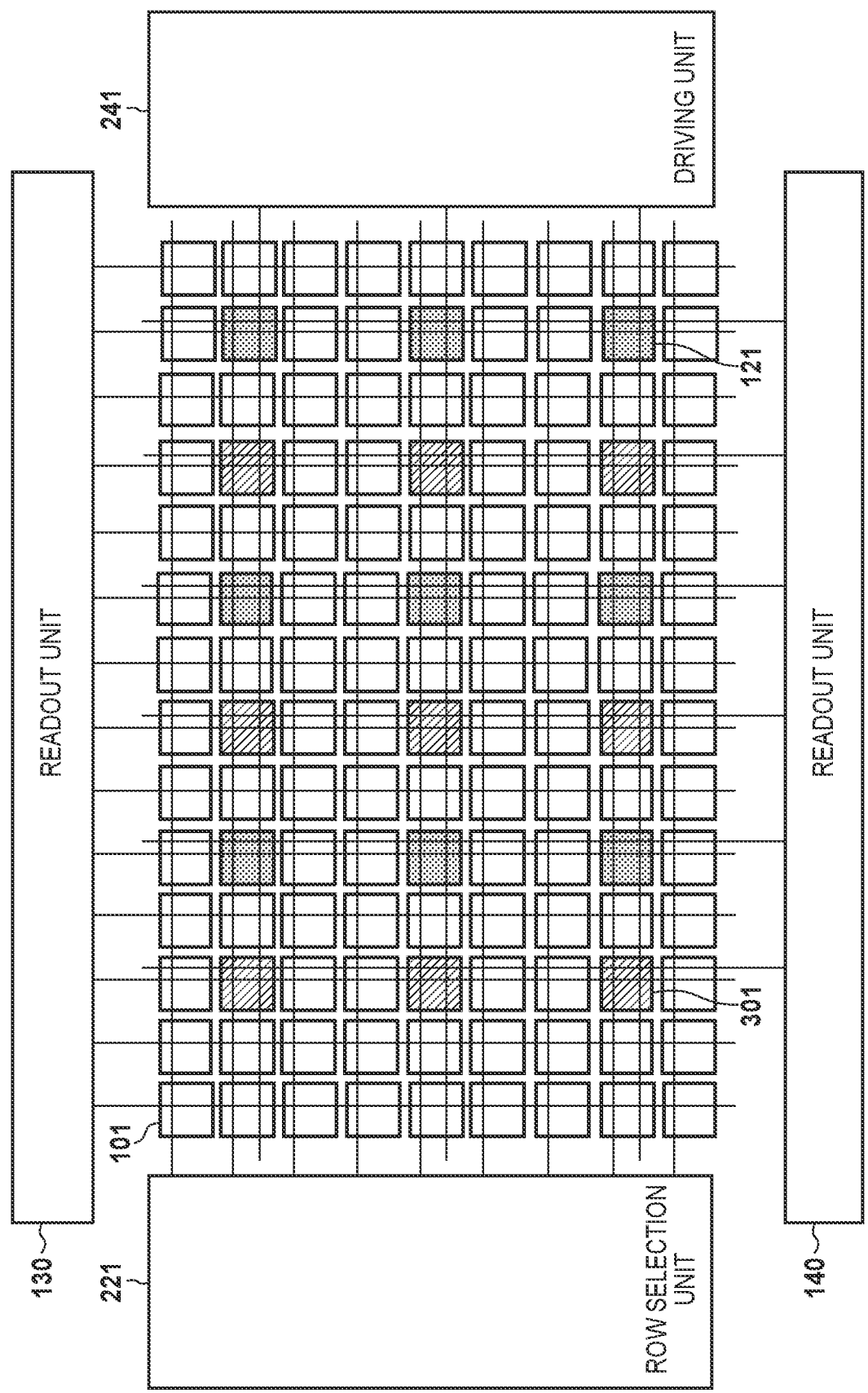
FIG. 13 is a view showing an example of the layout of detection elements.

An example of another layout of the first detection elements 121 and the second detection elements 301 will be described with reference to FIG. 13. The plurality of first detection elements 121 are arranged in a region where the pixels are arranged, and the plurality of second detection elements 301 are arranged near the first detection elements 121, as shown in FIG. 13. As described above, the plurality of second detection elements 301 are arranged, and the signals containing the crosstalk components from the second detection elements 301 are simultaneously read out. This makes it possible to reduce noise at the time of acquiring the crosstalk component and improve the detection accuracy of the ratio of change of the crosstalk component. Accordingly, the correction accuracy of the crosstalk components in the first detection elements can be improved, and the detection accuracy of the radiation components can be improved.

Second Embodiment

Figure 14:
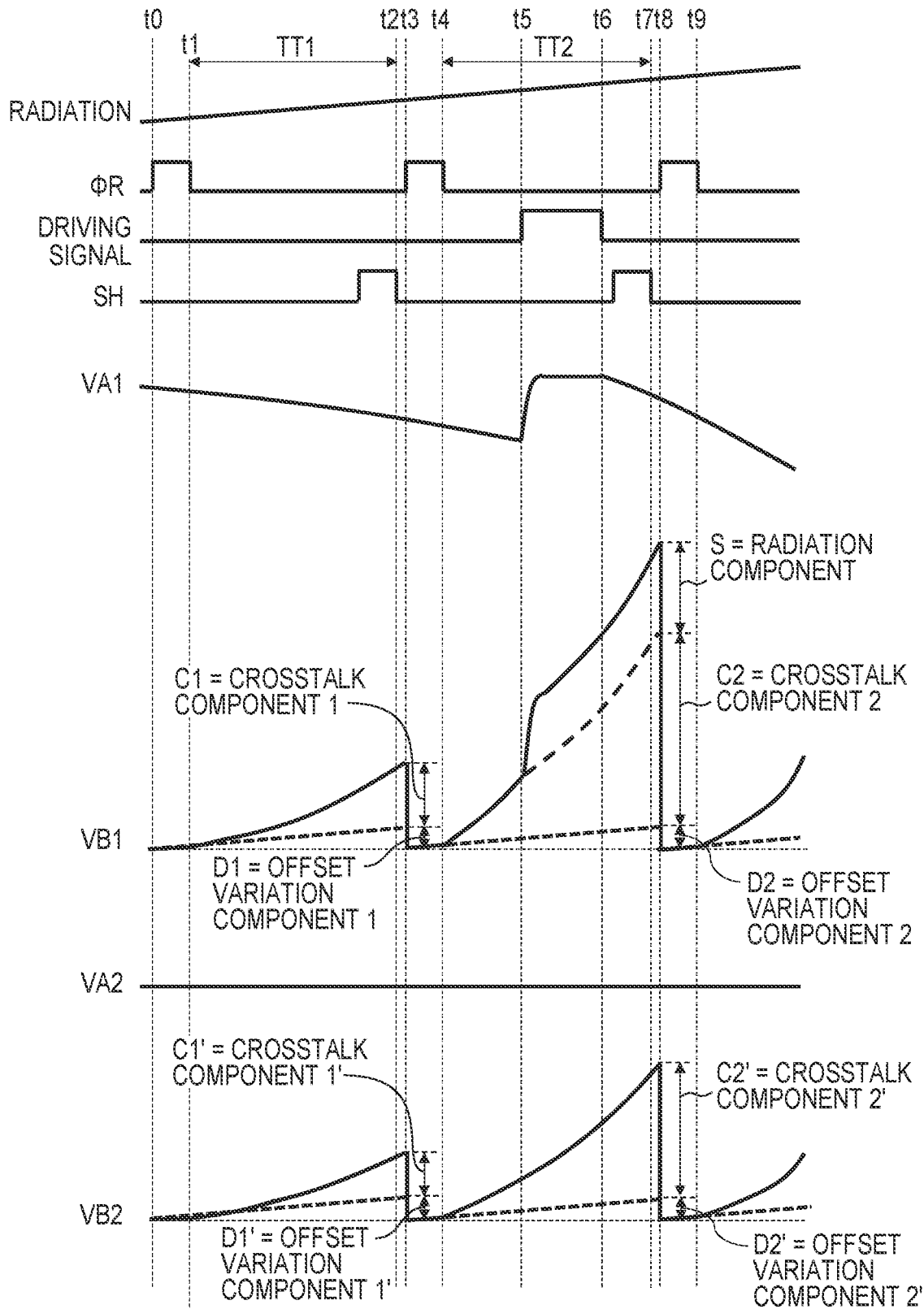
FIG. 14 is a timing chart showing an operation of a radiation imaging apparatus according to the second embodiment of the present invention.

Next, correction performed when an offset component varies as a function of time will be described below. In this embodiment, a first detection element 121 and a second detection element 301 are arranged as in the first embodiment. If the first detection element 121 and the second detection element 301 are arranged close to each other, the magnitudes of the offset components by the dark currents are almost equal to each other. By using this characteristic, a signal is corrected by the difference between the output signals from the first detection element 121 and the second detection element 301, thereby improving the detection accuracy. FIG. 14 shows that the offset component varies as a function of time in addition to FIG. 11. In this case, the offset component is a component based on the leakage current, dark current, offset level, and the like of each detection element. In this case, the detection accuracy is degraded by not only the crosstalk component but also the offset variation component serving as the variation of the offset component. Correction is performed by combining the difference of the output signals of different periods from each detection element and the difference of the output signals from the first detection element 121 and the second detection element 301. First, the crosstalk component is reduced by the difference between the output signals in a period TT1 and a period TT2 of each detection element. Next, the offset variation component is reduced by the difference between the output signals from the first detection element 121 and the second detection element 301. More specifically, the following calculation (equation 2) is performed to obtain the corrected detection signal S.

$$\text{Detection signal } S=\{(S+C2+D2)-(C1+D1)\}-\{(C2'+D2')-(C1'+D1')\}=S+\{(C2-C1)-(C2'-C1')\}+\{(D2-D1)-(D2'-D1')\} \quad (2)$$

When the first detection element 121 and the second detection element 301 are arranged close to each other, the dark current characteristics become equal to each other, and the magnitudes of the offset variation components become almost equal to each other $\{(D2-D1)\approx(D2'-D1')\}$. The doses of the radiation to the respective detection elements become equal to each other, and the crosstalk components become almost equal to each other $\{(C2-C1)\approx(C2'-C1')\}$. For this reason, if correction according to this embodiment is performed such that the first detection element 121 and the second detection element 301 are arranged closer to each other, correction accuracy is improved. This example is an example in which correction is performed sequentially in the order of the difference between output signals of different periods of each detection element and the difference between the output signals from the first detection element 121 and the second detection element 301. However, the correction result does not change even if the order is changed.

Third Embodiment

Figure 15:
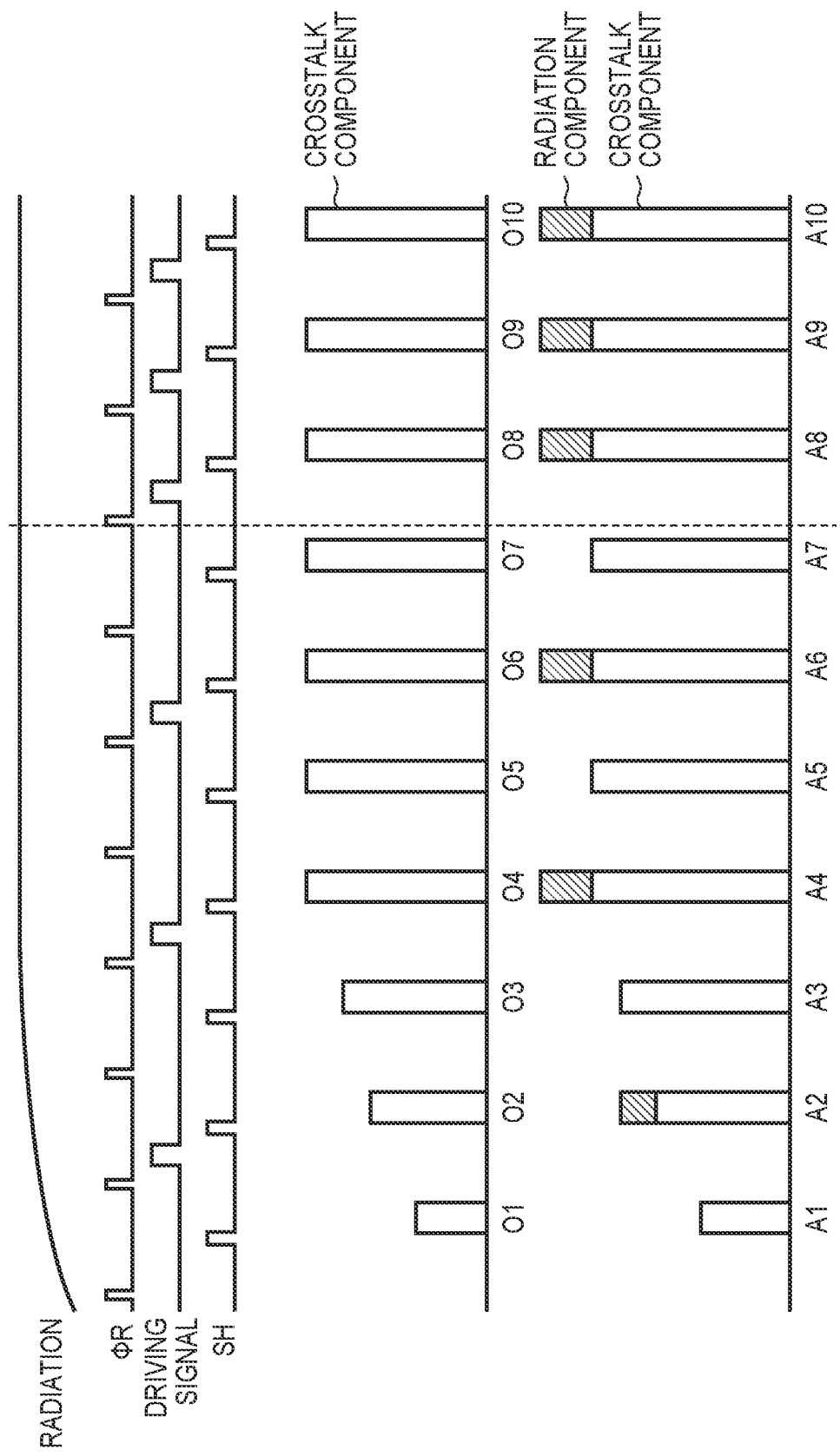
FIG. 15 is a timing chart showing an operation of a radiation imaging apparatus according to the third embodiment of the present invention.

Next, driving for improving the time resolution when detecting radiation dose will be described with reference to FIG. 15. FIG. 15 shows the dose change of the radiation, the driving method, and output signals from a first detection element and a second detection element. Signals O1 to O3 indicate initial readout from the start of radiation irradiation. As in the first embodiment, if the dose of the radiation changes, readout for performing SH in a state in which the driving signal is not set to high level and the switch is not set in the conductive state, and readout for performing SH after the driving signal is set to high level and the switch is set in the conductive state are alternately performed. After that, (readout of signals O4 to O7) is similarly driven. If it is determined that the change in crosstalk component is a small value equal to or less than a predetermined threshold in the signals O4 to O7 from the second detection element, calculating the crosstalk component each time and acquiring a corrected crosstalk component are stopped. Since in the signal from a signal O8, the ratio of change of the crosstalk component is small, the crosstalk component is reduced using information of the crosstalk component obtained by readout of A4 to A7. Since the acquisition of the crosstalk component is unnecessary, subsequently (readout from the signal O8) the driving signal is set to high level and the switch is set in the conductive state, and then the mode is switched to readout for only SH, thereby performing correction by the crosstalk component before the switching. In this driving method, the sampling time interval of the radiation component can be shortened, and the time resolution of exposure stop determination in the AEC can be improved.

Fourth Embodiment

Figure 16:
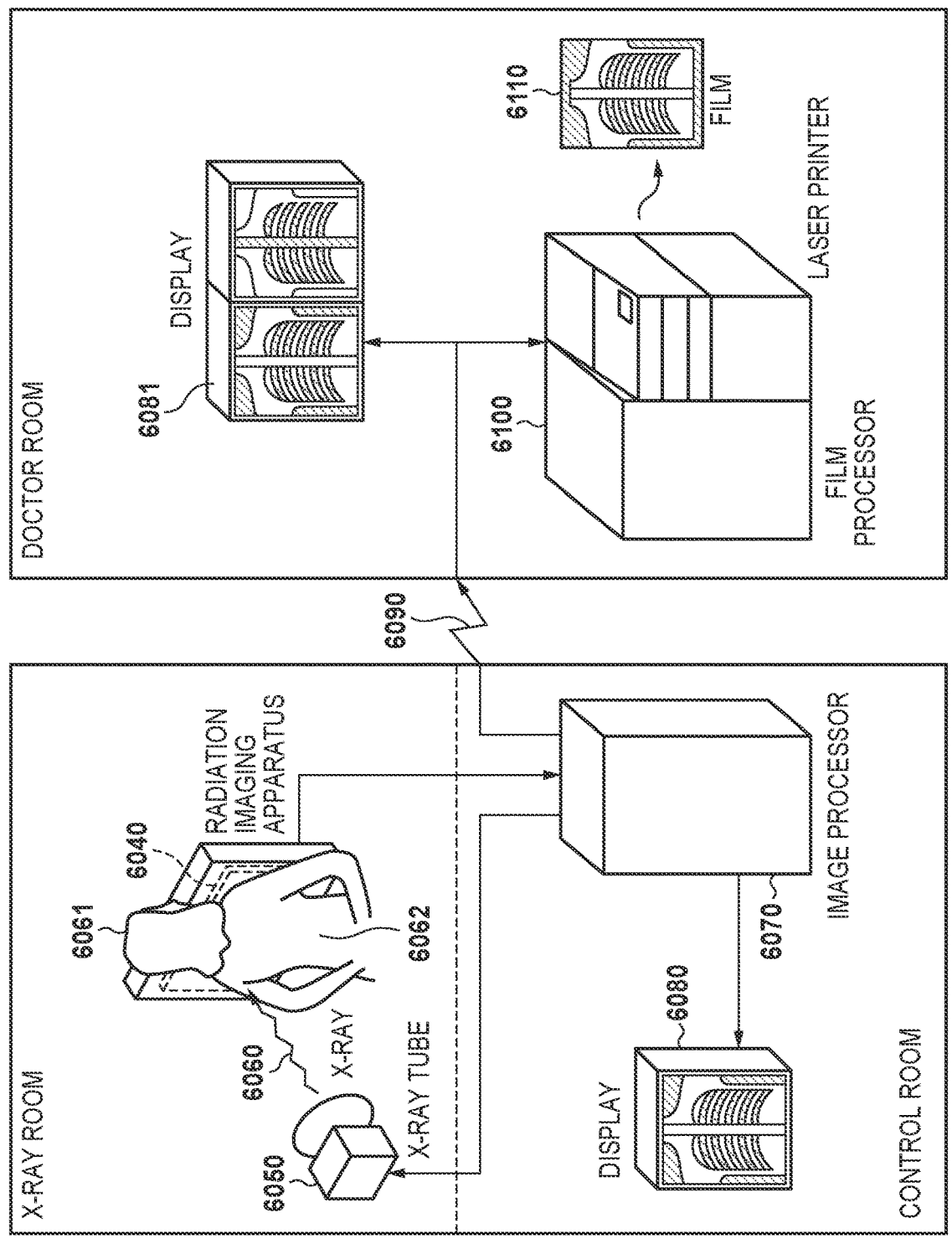
FIG. 16 is a view showing an example of the arrangement of a radiation detection system.

An example of applying a radiation imaging apparatus 200 to a radiation detecting system will be described below with reference to FIG. 16. An X-ray 6060 generated by an X-ray tube 6050 as a radiation source enters a radiation imaging apparatus 6040 represented by the above-described radiation imaging apparatus 200 through a chest 6062 of a patient or subject 6061. This incident X-ray contains information of the interior of the body of the subject 6061. A scintillator emits light in response to the incidence of the X-ray, and photoelectric conversion elements photoelectrically convert the light, thereby obtaining electrical information. This information is converted into digital data, undergoes image processing by an image processor 6070 serving as a signal processing unit, and can be observed on a display 6080 serving as a display unit of a control room.

This information can also be transferred to a remote place by a transmission processing means such as a telephone line 6090, and can be displayed on a display 6081 serving as a display means of a doctor room or the like in another place or saved in a storage unit such as an optical disk. Thus, a doctor in the remote place can make a diagnosis. In addition, this information can be recorded on a film 6110 serving as a recording medium by a film processor 6100 serving as a recording medium.

Other Embodiments

The present invention can be implemented by processing of supplying a program for implementing one or more functions of the above-described embodiments to a system or apparatus via a network or storage medium, and causing one or more processors in the computer of the system or apparatus to read out and execute the program. The present invention can also be implemented by a circuit (for example, an ASIC) for implementing one or more functions.

The present invention can provide a technique advantageous in reducing the influence of the crosstalk and offset components for the signal from the element for detecting radiation.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A radiation imaging apparatus, comprising:
at least one first detection element including a first conversion element configured to convert radiation into an electrical signal and a first switch configured to connect an output from the first conversion element to a first signal line;
at least one second detection element including a second conversion element configured to convert radiation into an electrical signal and a second switch configured to connect an output from the second conversion element to a second signal line;
a readout unit configured to read out signals appearing on the first signal line and the second signal line;
a reset unit configured to reset potentials of the first signal line and the second signal line; and
a signal processing circuit configured to process a signal read out from the readout unit, wherein
a sensitivity of the first conversion element for the radiation is set to be different from a sensitivity of the second conversion element for the radiation,
a period for causing the readout unit to read out the signals from the first signal line and the second signal line includes a first period including an operation for resetting voltages of the first signal line and the second signal line by the reset unit and a subsequent operation for reading out the signals appearing on the first signal line and the second signal line in a state in which the first switch and the second switch are not rendered conductive, and a second period including an operation for resetting the voltages of the first signal line and the second signal line by the reset unit and a subsequent operation for reading out the signals appearing on the first signal line and the second signal line after the first switch and the second switch are rendered conductive, and
the signal processing circuit corrects the signal read out from the first signal line in the second period based on the signals read out from the second signal line in the first period and the second period.

2. The radiation imaging apparatus according to claim 1, wherein the signal processing circuit calculates a ratio of magnitudes of the signals appearing on the second signal line that read out in the first period and the second period, and the signal appearing on the first signal line in the second period is corrected based on the signal appearing on the first signal line in the first period and the ratio of the magnitudes.

3. The radiation imaging apparatus according to claim 1, wherein the signal processing circuit calculates a difference between signals appearing on the first signal line read out in the first period and the second period and a difference between signals appearing on the second signal line read out in the first period and the second period, and corrects the signal appearing on the first signal line.

4. The radiation imaging apparatus according to claim 2, wherein if the ratio of the magnitudes is not more than a predetermined threshold, the readout unit stops operations in the first period and the second period, and an operation for resetting a voltage of the first signal line and then an operation for reading out the signal appearing on the first signal line after the first switch is rendered conductive are started.

5. The radiation imaging apparatus according to claim 1, wherein the radiation imaging apparatus comprises a scintillator configured to convert radiation into light, and each of the first conversion element and the second conversion element includes a photoelectric conversion element configured to convert the light into an electrical signal.

6. The radiation imaging apparatus according to claim 5, wherein a shielding member is arranged between the scintillator and the second conversion element.

7. The radiation imaging apparatus according to claim 1, wherein a size of a region configured to detect radiation of the first conversion element is different from a size of a region configured to detect radiation of the second conversion element.

8. The radiation imaging apparatus according to claim 1, wherein a bias voltage applied to the first conversion element is different from a bias voltage applied to the second conversion element.

9. The radiation imaging apparatus according to claim 1, wherein in an imaging region in which the first detection element and the second detection element are arranged, the second detection element is arranged in a peripheral portion of the imaging region.

10. The radiation imaging apparatus according to claim 1, wherein in an imaging region in which the first detection element and the second detection element are arranged, the second detection element comprises a plurality of second detection elements.

11. A radiation imaging system comprising:
a radiation imaging apparatus defined in claim 1; and
a signal processing unit configured to process a signal from the radiation imaging apparatus.

12. The radiation imaging apparatus according to claim 1, wherein the first detection element and the second detection element are irradiated with radiation during the first period and the second period.

13. The radiation imaging apparatus according to claim 1, wherein the sensitivity of the second conversion element is lower than the sensitivity of the first conversion element.

14. A radiation imaging apparatus, comprising:
at least one first detection element including a first conversion element configured to convert radiation into an electrical signal and a first switch configured to connect an output from the first conversion element to a first signal line;
at least one second detection element including a second conversion element configured to convert radiation into an electrical signal and a second switch configured to connect an output from the second conversion element to a second signal line;
a readout unit configured to read out signals appearing on the first signal line and the second signal line;
a reset unit configured to reset potentials of the first signal line and the second signal line; and
a signal processing circuit configured to process a signal read out from the readout unit, wherein
a sensitivity of the first detection element for the radiation is higher than a sensitivity of the second detection element for the radiation,
a period for causing the readout unit to read out the signals from the first signal line and the second signal line includes
a first period including an operation for resetting voltages of the first signal line and the second signal line by the reset unit and a subsequent operation for reading out the signals appearing on the first signal line and the second signal line in a state in which the fist switch and the second switch are not rendered conductive, and a second period including an operation for resetting the voltages of the first signal line and the second signal line by the reset unit and a subsequent operation for reading out the signals appearing on the first signal line and the second signal line after the first switch and the second switch are rendered conductive, the first detection element and the second detection element being irradiated with radiation during the first period and the second period, and
the signal processing circuit corrects the signal read out from the first signal line in the second period based on the signals read out from the second signal line in the first period and the second period.

15. The radiation imaging apparatus according to claim 14, wherein the radiation imaging apparatus comprises a scintillator configured to convert radiation into light, and each of the first conversion element and the second conversion element includes a photoelectric conversion element configured to convert the light into an electrical signal.

16. The radiation imaging apparatus according to claim 15, wherein the second detection element comprises a shielding member that covers the second conversion element.

* * * * *